(12) United States Patent
Wilt et al.

(10) Patent No.: US 8,499,193 B2
(45) Date of Patent: Jul. 30, 2013

(54) INTEGRATED DISSIMILAR HIGH INTEGRITY PROCESSING

(75) Inventors: Nicholas Wilt, Glendale, AZ (US); Scott Gray, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 433 days.

(21) Appl. No.: 12/847,687

(22) Filed: Jul. 30, 2010

(65) Prior Publication Data

US 2012/0030519 A1 Feb. 2, 2012

(51) Int. Cl.
*G06F 11/00* (2006.01)

(52) U.S. Cl.
USPC .......................................................... 714/12

(58) Field of Classification Search
USPC ...................................................... 714/11, 12
See application file for complete search history.

(56) References Cited

U.S. PATENT DOCUMENTS

| | | | |
|---|---|---|---|
| 5,550,736 A | 8/1996 | Hay et al. | |
| 6,065,135 A * | 5/2000 | Marshall et al. | 714/11 |
| 6,393,582 B1 | 5/2002 | Klecka et al. | |
| 6,505,317 B1 | 1/2003 | Smith et al. | |
| 7,107,484 B2 * | 9/2006 | Yamazaki et al. | 714/12 |
| 7,194,663 B2 * | 3/2007 | Fletcher et al. | 714/43 |
| 7,392,426 B2 * | 6/2008 | Wolfe et al. | 714/11 |
| 7,500,164 B2 | 3/2009 | Chelstrom et al. | |
| 7,673,188 B2 * | 3/2010 | Choate et al. | 714/45 |
| 7,809,863 B2 * | 10/2010 | Beutler et al. | 710/36 |
| 7,971,095 B2 * | 6/2011 | Hess et al. | 714/15 |
| 7,979,746 B2 * | 7/2011 | Cornelius et al. | 714/37 |
| 2002/0010880 A1 * | 1/2002 | Williams | 714/43 |
| 2002/0144176 A1 * | 10/2002 | Smith | 714/11 |
| 2006/0200278 A1 * | 9/2006 | Feintuch | 701/3 |
| 2008/0109642 A1 | 5/2008 | Beutler et al. | |
| 2011/0083041 A1 * | 4/2011 | Rohleder et al. | 714/15 |

* cited by examiner

*Primary Examiner* — Bryce Bonzo
*Assistant Examiner* — Elmira Mehrmanesh
(74) *Attorney, Agent, or Firm* — Fogg & Powers LLC

(57) ABSTRACT

A self-checking network is provided, comprising a first command processor configured to execute a performance function and a second command processor configured to execute the performance function, coupled to the first command processor. The self-checking network also comprises a first monitor processor configured to execute a monitor function that is coupled to the first command processor and a second monitor processor configured to execute the monitor function that is coupled to the second command processor. The first and second command processors compare outputs, the first and second monitor processors compare outputs, and the first monitor processor determines whether an output of the first command processor exceeds a first selected limit.

20 Claims, 3 Drawing Sheets

INTEGRATED DISSIMILAR HIGH INTEGRITY PROCESSING

BACKGROUND

A self-checking processor is a processing system that has redundant hardware used to detect faults in the system. A common self-checking processor (SCP) has two similar processors having two processing lanes. Faults are typically detected when the outputs of the two processing lanes differ. However, the SCP is susceptible to a class of faults existing in both processing lanes which are referred to as common-mode or generic faults. Both software and hardware design faults as well as common mode hardware manufacturing faults are common-mode faults that go undetected due to the complexity of the processor hardware, such as a complex high performance processor. This type of fault affects both processors of the SCP similarly, thus both processors output identical but wrong data when a fault is present. Because the outputs are identical, the SCP cannot detect these faults without an additional dissimilar processor to compare to the similar processors. This requires at least one of the similar processors to also execute a check of the dissimilar processor's function as an independent verification of the dissimilar processor's execution, thus increasing the performance demanded on at least one of the similar processors and the overall power required by the SCP.

SUMMARY

Some embodiments provide a self-checking network comprising a first command processor configured to execute a performance function, and a first monitor processor configured to execute a monitor function coupled to the first command processor. The self-checking network also comprises a second command processor coupled to the first command processor and configured to execute the performance function and a second monitor processor coupled to the second command processor that is configured to execute the monitor function. The first and second command processors compare outputs, the first and second monitor processors compare outputs, and the first monitor processor determines whether an output of the first command processor exceeds a first selected limit.

DRAWINGS

Features of the present invention will become apparent to those skilled in the art from the following description with reference to the drawings. Understanding that the drawings depict only typical embodiments and are therefore not to be considered limiting in scope, the invention will be described with additional specificity and detail through the use of the accompanying drawings, in which.

Like reference numbers and designations in the various drawings indicate like elements.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Some embodiments described herein provide two dissimilar processors, a command processor and a monitor processor, on a system-on-a-chip (SOC) device that is used in conjunction with an approximately identical SOC device. This creates two similar self checking processor (SCP) pairs, namely a command SCP and a monitor SCP. Two dissimilar self checking processor pairs are also created, that is, each command processor is paired with the monitor processor on the same SOC device. This configuration provides four self-checking pairs of processors.

Dissimilar processing is used to detect faults common to both processors in a SCP. By adding a dissimilar processor and lockstep circuits to the same chip with the primary command processor, and integrating cross-side comparison results from both the command SCP, the monitor SCP, and the dissimilar SCPs monitor results in providing a single valid output signal. A lockstep operation of the dissimilar pair of processors provides a high detection rate of random failures. The command processor does not have to execute code to verify the monitor processor's function, thereby reducing performance demand in the command processor. Other embodiments do not have a single chip (that is, not SOC) implementation. Other embodiments provide a dissimilar monitor processor with independent off-lane bus ports and validation logic circuitry. As used herein, the term "on-lane" applies to communications within a single SOC and "off-lane" or "cross-lane" applies to communications between at least two SOCs.

Figure 1:
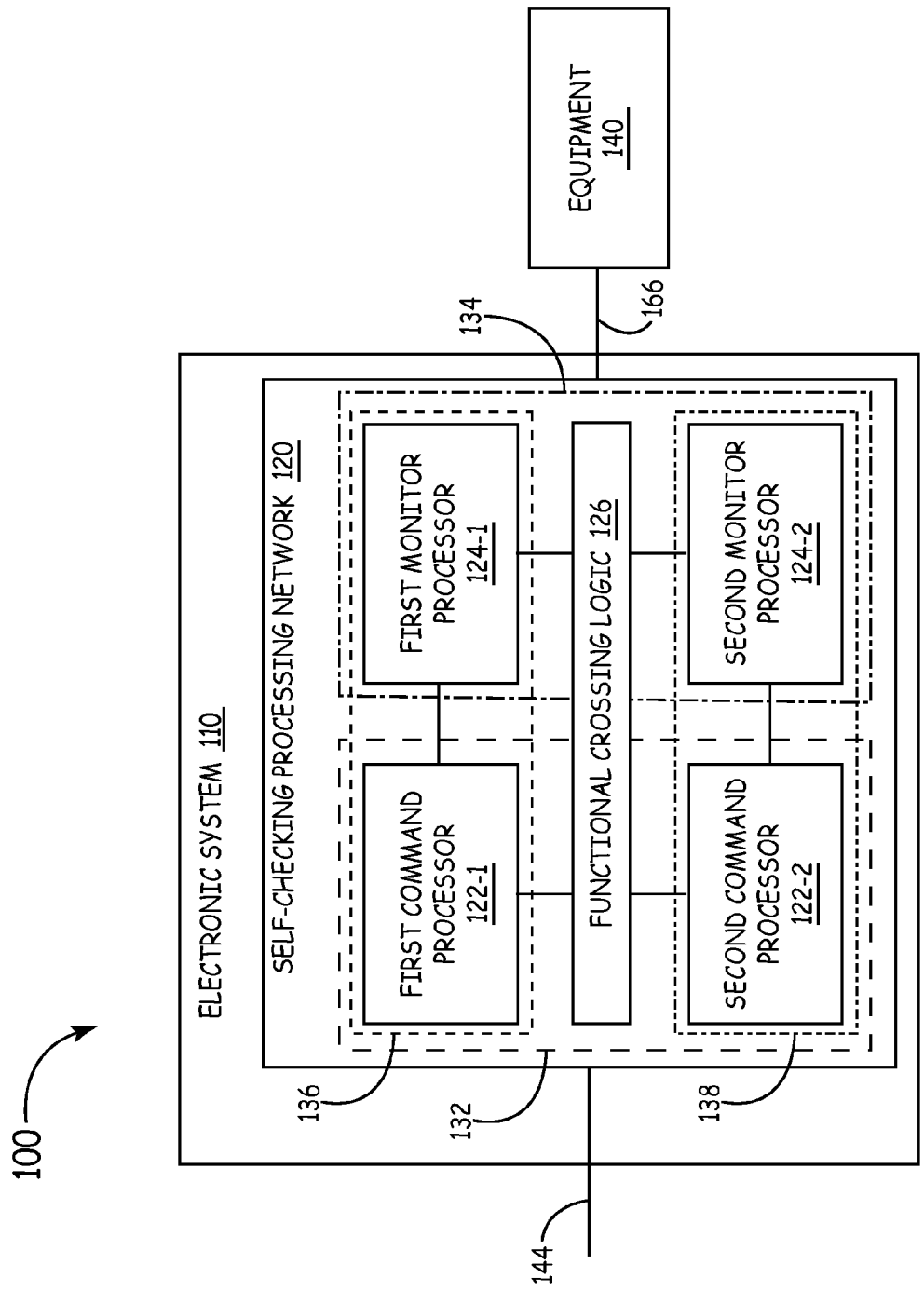
FIG. 1 is a block diagram of one embodiment of a system having a self-checking processing network.

FIG. 1 is a block diagram of one embodiment of a system 100 having a self-checking processing network 120. The system 100 comprises an electronic system 110 coupled to equipment 140. The electronic system 110 comprises the self-checking processing network 120 and is any system utilizing a high integrity computing system. The electronic system 110 provides at least a control signal 166 to the equipment 140. The self-checking processing network 120 receives an input signal 144 and ensures that the resulting output signal, control signal 166, does not have an error. In one embodiment, the electronic system 100 is an avionics system, or portion thereof, for an aircraft, satellite, spacecraft, etc. Some embodiments of the equipment 140 include, but are not limited to, avionics devices such as flight control surfaces, landing gear, communication systems, navigation systems, display systems, and the like.

The self-checking processing network 120 comprises at least four processors that are compared to each other for fault detection. The processors include a first command processor 122-1, a second command processor 122-2, a first monitor processor 124-1, and a second monitor processor 124-2. The processors are electrically coupled together via functional crossing logic 126. The first command processor 122-1 acts as the primary functional processor that outputs the control signal 166. The other processors 122-2, 124-1, and 124-2 play a supporting role in that they are used to ensure that the first command processor 122-1 is non-faulted. In other embodiments, another processor or combinations of processors function as the primary processor.

Embodiments of the processors 122-1, 122-2, 124-1, and 124-2 include any type of device that produces an output based on an input, including but not limited to, PowerPC processors such as 476FP and 476 RPC, IBM 750s, Advanced Reduced instruction set computer (RISC) Machine (ARM) processors, Tensilica processors, NIOS, or Microprocessor without Interlocked Pipeline Stages (MIPS) processors, table-based sequencers, state machines, and the like. In one embodiment, the command processors 122-1 and 122-2 are relatively high performance processors based on processing speed compared with the monitor processors 124-1 and 124-2 which are relatively low performance processors. In other embodiments, the command processors 122-1 and 122-2 are relatively high performance processors based on bus speed, cache size, clock rates, the complexity of the processor math cores, pipeline depths, branch prediction engines, a number of processing threads, or any other processor performance criteria.

In one embodiment, the command processors 122-1 and 122-2 are similar processors, meaning they are of the same type of processor. The command processors 122-1 and 122-2 also execute at least part of the same function. In some embodiments, the command processors 122-1 and 122-2 execute additional differing functions as well. In another embodiment, the monitor processors 124-1 and 124-2 are similar processors. Embodiments of the monitor processors 124-1 and 124-2 also execute at least part of the same function. In the embodiment shown in FIG. 1, the command processors 122-1 and 122-2 are similar processors and the monitor processors 124-1 and 124-2 are similar processors, however, the monitor processors 124-1 and 124-2 are dissimilar types of processors compared with the command processors 122-1 and 122-2. In this embodiment, the monitor processors 124-1 and 124-2 execute similar functions that are dissimilar compared with the functions executed by the command processors 122-1 and 122-4.

Figure 2:
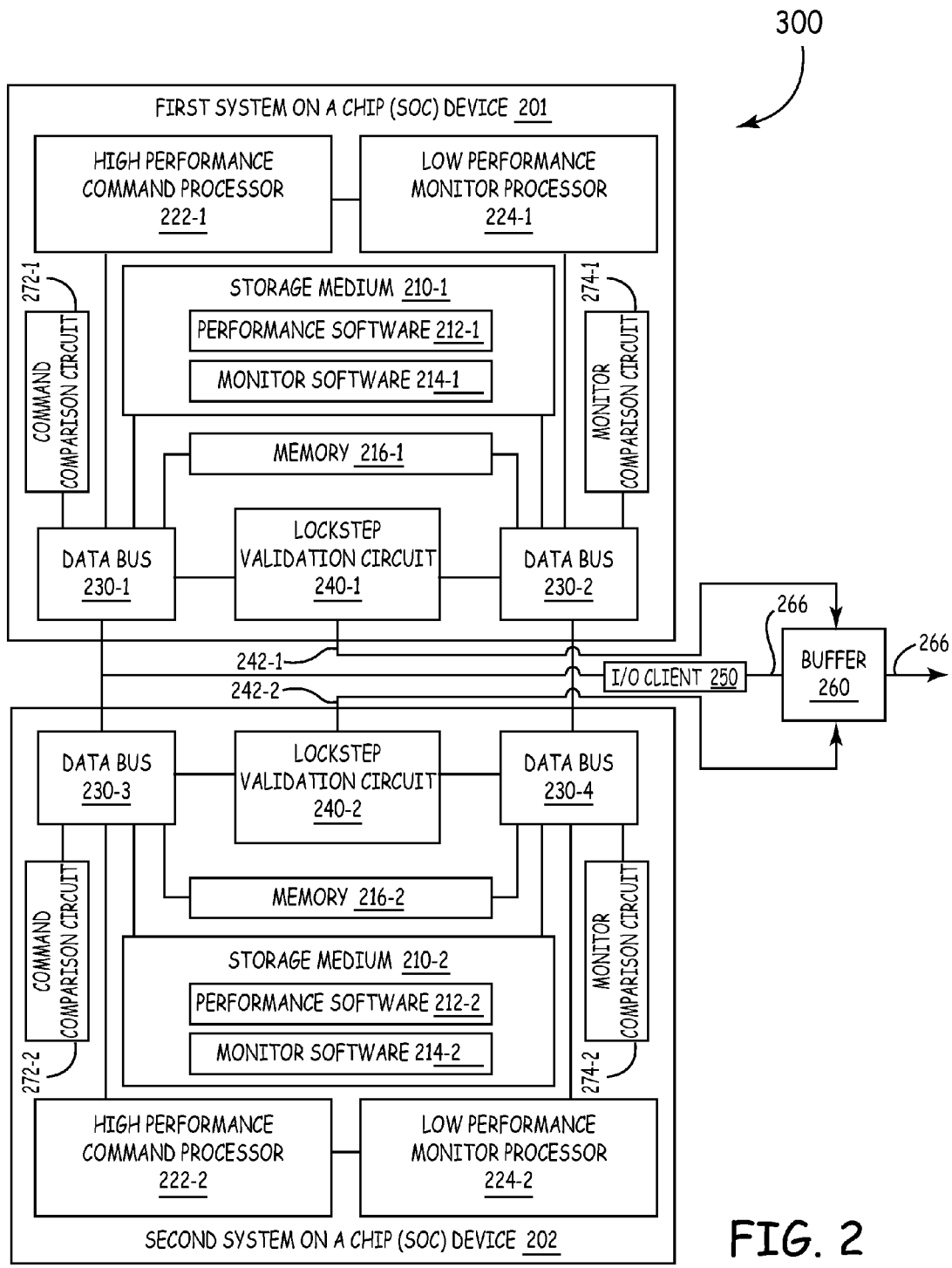
FIG. 2 is a block diagram of one embodiment of a self-checking processing network.

The processors of the SCP network 120 are paired to form self-checking processor pairs for fault detection. The two command processors 122-1 and 122-2 form a SCP pair 132. The command processors 122-1 and 122-2 each execute the same software function and thus should have identical outputs when non-faulted. Therefore, a comparison of the data paths of the command processors 122-1 and 122-2 is made to ensure that the command processors 122-1 and 122-2 are both functioning properly. In one embodiment, the comparison is a synchronous bit-by-bit comparison. One implementation of the command processors 122-1 and 122-2 operating synchronously is that they are in lockstep, meaning the command processors 122-1 and 122-2 produce data at approximately the same time as each other (for example, on the same clock). That is, the data from the command processor 122-1 is compared to a data output from the command processor 122-2 on a bitwise basis. A status signal is outputted based on the comparison, for example, by the command processors 122-1 and 122-2 or by comparison circuitry (as shown in FIG. 2). For example, if the comparison revealed that the data outputs were different, the status signal would be invalid, indicating a fault. If the comparison revealed the data outputs were the same on a bitwise basis, the status signal is valid, indicating the command processor 122-1 is non-faulted. Similarly, the command processor 122-2 outputs a status signal based on comparing the data outputs.

However, the lockstep bit-by-bit comparison of the command processors 122-1 and 122-2 will not detect all faults. For example, the SCP 132 will not detect a common-mode fault where both command processors 122-1 and 122-2 have an error (such as the same hardware error). That is, common-mode faults are undetectable solely by comparing the command processors 122-1 and 122-2 together. Therefore, at least one of the monitor processors 124-1 or 124-2 has to check at least one of the command processors 122-1 and 122-2.

Thus, in order to catch common-mode faults, at least one dissimilar comparison is made between the dissimilar processors. A dissimilar SCP 136 is formed between the first monitor processor 124-1 and the first command processor 122-1. The first monitor processor 124-1 monitors the first command processor 122-1 to ensure it is operating within a threshold performance range or within a limit or set of limits generated by the first monitor processor 124-1. Similarly, a dissimilar SCP 138 is formed between the second monitor processor 124-2 and the second command processor 122-2. The second monitor processor 124-2 monitors the second command processor 122-2 to ensure it is operating within limits generated by the monitor processor 124-2 or within a threshold range. In some embodiments, the first monitor processor 124-1 monitors the second command processor 122-2 or the second monitor processor 124-2 monitors the first command processor 122-1. Any combination of at least one of the monitor processors 124-1 or 124-2 monitoring at least one of the command processors 122-1 or 122-2 is contemplated.

A second similar SCP pair 134 is formed between the monitor processors 124-1 and 124-2. The monitor processors 124-1 and 124-2 execute the same software function and compare their outputs bit-by-bit to ensure that they are both performing properly. Additionally, each monitor processor 124-1 and 124-2 performs an off-lane comparison of their generated limits as a continuous scrub of their execution and input validity by transferring data to off-lane and performing the comparison in software executing on the monitor processors 124-1 and 124-2.

FIG. 2 is a block diagram of one embodiment of a self-checking processing network 200. The SCP network 200 comprises a first system-on-a-chip (SOC) device 201 communicatively coupled to a second SOC device 202. The SOC devices 201 and 202 are computing or electrical systems integrated into a single integrated circuit chip. Each SOC device 201 and 202 comprises two dissimilar processors packaged in a single substrate (such as a single piece of silicon or any other suitable substrate). Using SOC devices 201 and 202 reduces the size, weight, and amount of board space required for the SCP network 200 as compared with embodiments comprising discrete processors.

The first SOC device 201 comprises a high performance command processor 222-1, a low performance monitor processor 224-1, two data busses 230-1 and 230-2, a command comparison circuit 272-1, a monitor comparison circuit 274-1, a lockstep validation circuit 240-1, memory 216-1, and a storage medium 210-1. The high performance command processor 222-1 is a relatively high performance processor, such as a PowerPC or ARM processor, as compared with the low performance monitor processor 224-1, such as an ARM or MIPS processor. The high performance command processor 222-1 is communicatively coupled to the data bus 230-1 via a data bus port, which is in turn coupled to the lockstep validation circuit 240-1. Similarly, the low performance command processor 224-1 is communicatively coupled to the data bus 230-2, which is in turn coupled to the lockstep validation circuit 240-1.

In the embodiment shown in FIG. 2, the second SOC device 202 is substantially identical to the first SOC device 201. The second SOC device 202 comprises a high performance command processor 222-2, a low performance monitor processor 224-2, two data busses 230-3 and 230-4, a command comparison circuit 272-2, a monitor comparison circuit 274-2, a lockstep validation circuit 240-2, memory 216-2, and a storage medium 210-2. The functionality of these components is similar to that described for the analogous component in the first SOC device 201.

Using two approximately identical SOC devices 201 and 202 for the self-checking processing network 200 ensures that there are two similar SCP pairs and two dissimilar SCP pairs. This SCP network 200 detects all or nearly all random faults as well as common-mode faults. Furthermore, by using two of the same SOC device, only a single SOC design has to be developed and fabricated for the SCP network 200, thereby saving time and reducing cost.

The SOC devices 201 and 202 are externally connected to an Input/Output (I/O) client 250 and an output buffer 260. The I/O client 250 receives the data from the execution of the performance software 212-1 from the command processor 222-1 via the data bus 230-1. In some embodiments, the I/O client 250 formats the data from the command processor 222-1 data path, for example, serializing or deserializing the data. An input of the output buffer 260 is coupled to the output of the I/O client 250. The output buffer 260 acts as a gate-keeper for the output signal 266 inasmuch as the output buffer 260 disables the output signal 266 when a fault is detected and enables it when the processors 222-1, 222-2, 224-1, and 224-2 are non-faulted. In another embodiment, the output buffer 260 outputs a warning signal when a fault is detected.

The data busses 230-1 and 230-2 are any type of processor bus, including but not limited to, a discrete address data-type bus, a Peripheral Component Interconnect (PCI) bus, a PCI express (PCIe) bus, RapidIO bus, or any bus compatible with the respective processor to which it is coupled. The data busses 230-1 and 230-2 provide communication capabilities internal and external to the first SOC device 201. Similarly, the data busses 230-3 and 230-4 provide communication capabilities internal and external to the second SOC device 202.

The storage medium 210-1 stores program instructions for performance software 212-1 and monitor software 214-1. The high performance command processor 222-1 executes the performance software 212-1. In some embodiments, the performance software 212-1 is an application related to another device or system, such as an avionics system. The low performance monitor processor 224-1 executes the monitor software 214-1, which is an application used to monitor the high performance command processor 222-1.

Suitable storage devices or media 210-1 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices). Typically, a portion of the software 212-1 and 214-1 executed by the processors 222-1 and 224-1, respectively, and one or more data structures used by the software 212-1 and 214-1 during execution are stored in a memory 216-1. The memory 216-1 comprises, in one implementation of such an embodiment, any suitable form of random access memory (RAM) now known or later developed, such as dynamic random access memory (DRAM). In other embodiments, other types of memory are used.

In one embodiment, the self-checking processing network 200 performs four comparisons, two similar processor comparisons and two dissimilar processor comparisons. For the similar processor comparisons, the command comparison circuits 272-1 and 272-2 perform the comparison on the command processors 222-1 and 222-2 and outputs status signals to the lockstep validation circuits 240-1 and 240-2, respectively. The command comparison circuit 272-1 compares data from the command processor 222-1 bit-for-bit with the off-lane command processor 222-2 using typical lockstep comparison. A status signal is then provided to the lockstep validation circuit 240-1 based on the results of the comparison. The status signal is a discrete output that indicates there is no fault if the comparison reveals equivalent bits. In contrast, the status signal indicates a fault if the comparison detects at least one differing bit. Likewise, the command comparison circuit 272-2 provides the lockstep validation circuit 240-2 in the second SOC device 202 with a status signal based on this comparison. In another embodiment, the status signal is valid (meaning a fault is not detected) when fewer than a selected number of bits are different within a selected time period. In one embodiment, the command comparison circuits 272-1 and 272-2 are coupled directly to the lockstep validation circuits 240-1 and 240-2, respectively. In another embodiment, the command processors 222-1 and 222-2 perform the comparison themselves.

Similarly, the monitor comparison circuits 274-1 and 274-2 compare the data outputs of the monitor processors 224-1 and 224-2 in a lockstep bit-by-bit fashion. A discrete output indicating the results of the comparison is also provided to the lockstep validation circuits 240-1 and 240-2. The command comparison circuit 272-1 and the monitor comparison circuit 274-1 each provide a status signal to the lockstep validation circuit 240-1, and the command comparison circuit 272-2 and the monitor comparison circuit 274-2 each provide a status signal to the lockstep validation circuit 240-2. In one embodiment, each comparison circuit 272-1, 272-2, 274-1, and 274-2 provide a status signal to both lockstep validation circuits 240-1 and 240-2. In another embodiment, each processor 222-1, 222-2, 224-1, and 224-2 provide a status signal to both lockstep validation circuits 240-1 and 240-2. In yet another embodiment, the monitor comparison circuits 274-1 and 274-2 are coupled directly to the lockstep validation circuits 240-1 and 240-2, respectively.

For the dissimilar processor comparisons, data from the command processor 222-1 is compared within limits by the on-lane monitor processors 224-1 (and similarly for command processor 222-2 and monitor processor 224-2). The comparison is valid if the off-lane bit-for-bit comparison is also valid; indicating the first SOC device 210 has no random faults. Additionally, each monitor processor 224-1 and 224-2 performs an off-lane comparison of their generated limits as a continuous scrub of their execution and input validity. The status of these comparisons is provided to the lockstep validation circuit 240-1 and 240-2 as a discrete output for each SOC lane.

The lockstep validation circuit 240-1 sums the results of the bit-for-bit lockstep comparisons and the dissimilar monitor comparison to produce an overall output discrete signal 242-1. If any of the status signals provided to the lockstep validation circuit 240-1 indicates a fault, the output discrete signal 242-1 is invalid. The output discrete signal 242-1 is provided to an enable input of an output buffer 260. If the output discrete signal 242-1 is invalid, the output buffer 260 is disabled and the output signal 266 is not passed outside the SCP network 200 (for example, to equipment 140).

Symmetrically for the SOC device 202, the lockstep validation circuit 240-2 sums the results of the bit-for-bit lockstep comparisons and the dissimilar monitor comparison to produce an overall output discrete signal 242-2 with the same functions as discussed above for the SOC device 201. If the output discrete signal 242-2 is invalid, the output buffer 260 is disabled and the output signal 266 is not passed. However, the output signal 266 is passed through the output buffer 260 (in other words, the output buffer 260 is enabled) when both the discrete signals 242-1 and 242-2 are valid, indicating that no faults are present within the SCP network 200.

In other embodiments, the output buffer 260 is enabled when only one of the discrete signals 242-1 and 242-2 are valid. In such an embodiment, one implementation of the SCP network 200 outputs a signal indicating a fault and identifying the location of the fault. In another embodiment, the lockstep validation circuit 240-1 or 240-2 outputs a valid discrete signal 242-1 or 242-2, respectively, as long as there are less than a specified number of bit-by-bit errors within a given time period.

Figure 3:
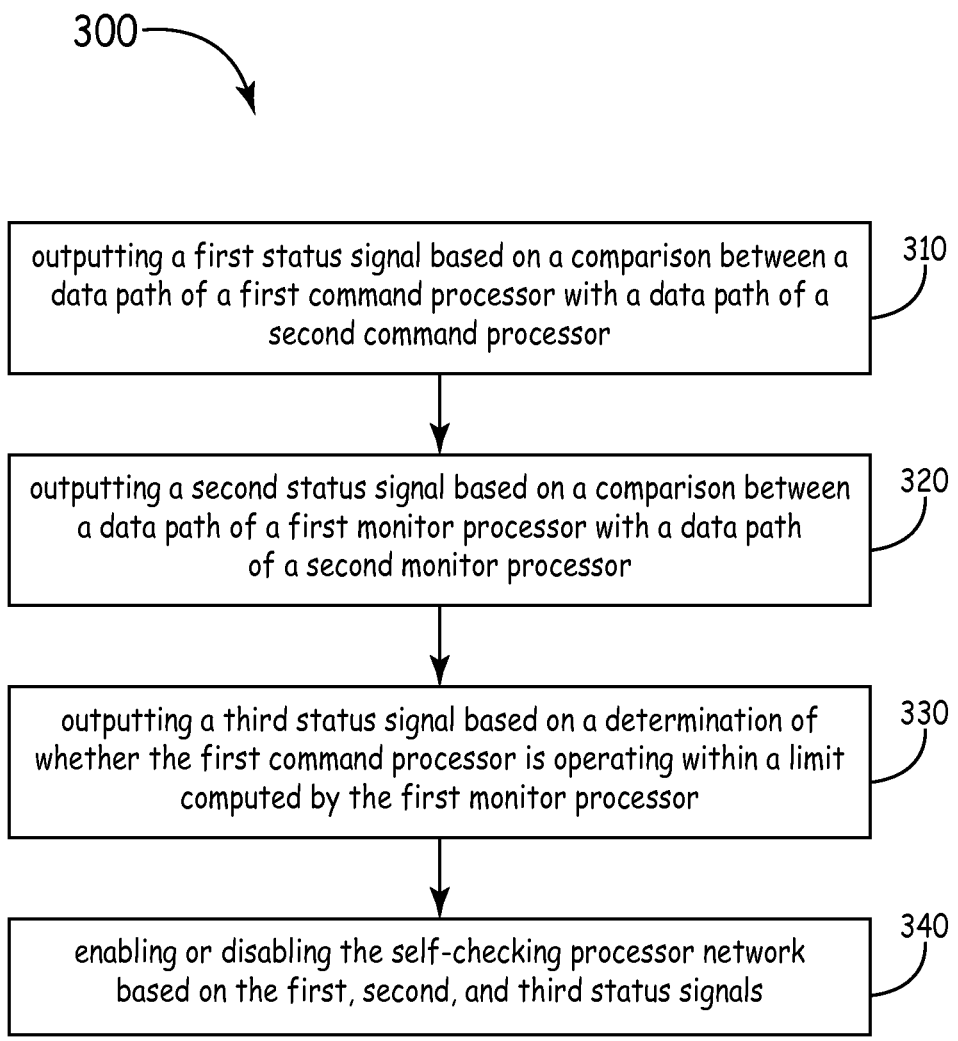
FIG. 3 is a flowchart of one embodiment of a method for fault detection in a self-checking processing network.

FIG. 3 is a flowchart of one embodiment of a method 300 for fault detection of a self-checking processing network. A first status signal is outputted based on a comparison between a data path of the first command processor 222-1 with a data path of the second command processor 222-2 (block 310). The first status signal is valid when the data paths are either approximately the same, identical on a bit-by-bit comparison, or have fewer discrepancies on a bit-by-bit basis than a selected threshold level. It is to be understood that other methods of comparison known to one of skill in the art are used in other embodiments to determine if the status signal is valid.

Similarly, a second status signal is outputted based on a comparison between a data path of the first monitor processor 224-1 with a data path of the second monitor processor 224-2 (block 320). The second status signal is valid for any of the conditions described above for the first status signal. The first and second status signals are provided to the lockstep validation circuits 240-1 and 240-2.

A third status signal is outputted based on whether the first command processor 222-1 is operating within a limit computed by the first monitor processor 224-1 (block 330). The limit is a value or range of values for the output data signal of the first command processor 222-1 that the first monitor processor 224-1 determines is acceptable for the performance of the first command processor 222-1. For example, if the first command processor 222-2 has a higher resolution (for example, outputs floating point values) and the first monitor processor 224-1 has a lower resolution (for example, outputs only integer values), the first monitor processor 224-1 will generate a range of limits that includes acceptable data outputs of the first command processor 222-2. In one embodiment, the limit computed by the first monitor processor 224-1 is a first set of limits. The third status signal is valid when the first command processor 222-1 is operating within the limits. The third status signal is provided to the lockstep validation circuit 240-1. In another embodiment, the first monitor processor 224-1 monitors the first command processor 222-1 by determining whether other data of the same type of data as the input 144 used by the first command processor 222-1 is within an acceptable limit. For example, the first monitor processor 224-1 monitors the first command processor 222-1 which generates an actuator rate command using a slew rate limit.

In another embodiment, a fourth status signal is provided to the lockstep validation circuit 240-2. The fourth status signal is based on whether the second command processor 222-2 is operating within a second limit or second set of limits computed by the second monitor processor 224-1. The fourth status signal is valid when the second command processor 222-2 is operating within the limits, indicating the second command processor 222-2 is non-faulted.

The self-checking processor network 200 is enabled or disabled based on the first, second, and third status signal (block 340). That is, a buffer 260 is enabled to pass output signal 266 when at least the first, second, and third status signals are valid. The status signals are valid when the SOC devices 201 and 202 are non-faulted. In another embodiment, the self-checking processor network 200 is enabled or disabled based on the first, second, third, and fourth status signals. That is, the SCP network 200 is enabled when all four status signals are valid.

In one embodiment, when any one of the status signals indicates a fault, the self-checking processor network 200 shuts down and the output signal 266 is disabled. In another embodiment, the buffer 260 outputs a warning or fault identification signal when one of the status signals indicates a fault.

Dissimilar processing is used to detect faults common to both processors or processing lanes in a SCP. By adding a dissimilar processor and lockstep circuits to the same chip with the primary processor, and integrating the cross-side comparison results from both the primary and dissimilar SCPs and the dissimilar process monitor results to provide a single valid output signal, a high integrity processor with dissimilar checks with no additional weight, volume, power use, and with less software required on the command SCP can be built as compared with typical SCPs. The dissimilar monitor processor is protected against random faults without increasing the processing burden in the command processor SCP by requiring the command processor to execute the monitor software.

A computer or processor implementing the various embodiments described above can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

Embodiments of the methods described above can be implemented by computer executable instructions, such as program modules or components, which are executed by a processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method and system of the invention can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A self-checking network, comprising:
a first command processor configured to execute a performance function;
a first monitor processor configured to execute a monitor function, coupled to the first command processor;
a second command processor configured to execute the performance function, coupled to the first command processor; and
a second monitor processor configured to execute the monitor function, coupled to the second command processor; and
wherein the first and second command processors compare outputs, the first and second monitor processors compare outputs, and the first monitor processor determines whether an output of the first command processor exceeds a first selected limit.

2. The network of claim 1, wherein:
the first command processor is similar to the second command processor; and
the first monitor processor is similar to the second monitor processor.

3. The network of claim 2, wherein the first command processor is dissimilar to the first monitor processor.

4. The network of claim 2, wherein the first command processor has a higher performance than the first monitor processor.

5. The network of claim 1, further comprising:
wherein the first monitor processor generates a first selected limit;
wherein the second monitor processor generates a second selected limit; and
wherein the first monitor processor compares the first selected limit to the second selected limit and performs a continuous scrub of the first monitor processors execution and input validity.

6. The network of claim 1, wherein:
the first command processor and the first monitor processor are co-located in a first system-on-a-chip (SOC); and
the second command processor and the second monitor processor are co-located in a second SOC.

7. The network of claim 6, wherein the first SOC and the second SOC are approximately identical.

8. The network of claim 1, further comprising:
an output buffer that receives an output signal of the first command processor.

9. The network of claim 8, further comprising:
wherein the first and second command processors compare outputs further comprises wherein the first command processor outputs a first status signal when a data path of the first command processor is identical to a data path of the second command processor on a bit-by-bit basis;
wherein the first and second monitor processors compare outputs further comprises wherein the first monitor processor outputs a second status signal when a data path of the first monitor processor is identical to a data path of the second monitor processor on a bit-by-bit basis;
a lockstep validation circuit that enables the output buffer based on the first status signal, the second status signal, and whether the output of the first command processor exceeds the first selected limit.

10. A method of operating a self-checking processor network, comprising:
outputting a first status signal based on a comparison between a data path of a first command processor with a data path of a second command processor;
outputting a second status signal based on a comparison between a data path of a first monitor processor with a data path of a second monitor processor;
outputting a third status signal based on a determination of whether the first command processor is operating within a limit computed by the first monitor processor; and
enabling or disabling the self-checking processor network based on the first, second, and third status signals.

11. The method of claim 10, wherein:
outputting a first status signal based on a comparison further comprises comparing the data path of the first command processor with the data path of the second command processor on a lockstep bit-by-bit basis, wherein the first status signal is valid when the data paths of the first and second command processors do not differ; and
outputting a second status signal based on a comparison further comprises comparing the data path of the first monitor processor with the data path of the second monitor processor on a lockstep bit-by-bit basis, wherein the second status signal is valid when the data paths of the first and second monitor processors do not differ; and
the third status signal is valid when the first command processor is operating within the selected limit.

12. The method of claim 11, wherein enabling or disabling the self-checking processor network further comprises outputting data on the data path of the first command processor only when the first, second, and third status signal are valid.

13. The method of claim 11, further comprising:
outputting a fourth status signal based on a determination of whether the second command processor is operating within the selected limit based on a comparison between the data path of the second command processor and the data path of the second monitor processor, wherein the fourth status signal is valid when the second command processor is operating within the selected limit; and
wherein enabling or disabling the self-checking processor network further comprises outputting data on the data path of the first command processor only when the first, second, third, and forth status signals are valid.

14. The method of claim 10, further comprising:
outputting a fault signal when the output of the data path of the first command processor is disabled, wherein at least one of the first, second, and third status signals is invalid.

15. A self-checking processing system, comprising:
a first system-on-a-chip (SOC) device, comprising:
a first command processor that executes performance software over a first data path;
a first monitor processor coupled to the first command processor; and
a first lockstep validation circuit; and
a second SOC device coupled to the first SOC device, comprising:
a second command processor similar to the first command processor that executes the performance software over a second data path;
a second monitor processor similar to the first monitor processor coupled to the second command processor; and
wherein the first command processor and the second command processor form a first self-checking pair and output a first status signal based on a first threshold comparison of a data path of the first command processor and a data path of the second command processor;

wherein the first monitor processor and the second monitor processor form a second self-checking pair and output a second status signal based on a second threshold comparison of a data path of the first monitor processor and a data path of the second monitor processor; and wherein the first lockstep validation circuit outputs a first enable signal based on the first and second status signals.

16. The system of claim 15, wherein the first and second threshold comparisons are lockstep bit-by-bit comparisons.

17. The system of claim 15, further comprising:
wherein the first monitor processor computes a first set of limits to compare to the data path of the first command processor, wherein a first monitor status signal is provided to the first lockstep validation circuit when the first command processor is operating within the first set of limits;

wherein the second SOC devices further comprises a second lockstep validation circuit; and wherein the second monitor processor computes a second set of limits to compare to the data path of the second command processor, wherein a second monitor status signal is provided to the second lockstep validation circuit when the second command processor is operating within the second set of limits.

18. The system of claim 17, wherein:
the first enable signal is further based on the first monitor status signal; and wherein the second lockstep validation circuit outputs a second enable signal based on the second status signal and the second monitor status signal.

19. The system of claim 18, further comprising:
an output buffer that is enabled or disabled based on the first enable signal and the second enable signal, wherein the output buffer outputs the data path of the first command processor when the first enable signal and the second enable signal indicate the first and second SOC devices are non-faulted.

20. The system of claim 19, further comprising:
at least one avionics device coupled to an output of the output buffer; and wherein the data path of the first command processor provides a control signal for the at least one avionics device to the output buffer.

* * * * *